(12) United States Patent
Taptič et al.

(10) Patent No.: US 11,367,941 B2
(45) Date of Patent: *Jun. 21, 2022

(54) QUICK COUPLING ASSEMBLIES

(71) Applicant: RF Elements S.R.O., Bratislava (SK)

(72) Inventors: Juraj Taptič, Zálesie (SK); Martin Marcinčák, Humenné (SK)

(73) Assignee: RF ELEMENTS SRO, Bratislava (SK)

( * ) Notice: Subject to any disclaimer, the term of this patent is extended or adjusted under 35 U.S.C. 154(b) by 111 days.

This patent is subject to a terminal disclaimer.

(21) Appl. No.: 16/733,275

(22) Filed: Jan. 3, 2020

(65) Prior Publication Data

US 2020/0144696 A1 May 7, 2020

Related U.S. Application Data

(63) Continuation of application No. 15/587,079, filed on May 4, 2017, now Pat. No. 10,587,031.

(51) Int. Cl.
*F16B 7/20* (2006.01)
*H01Q 1/12* (2006.01)
(Continued)

(52) U.S. Cl.
CPC ............... *H01Q 1/22* (2013.01); *F16B 7/20* (2013.01); *H01P 1/042* (2013.01); *H01Q 1/088* (2013.01);
(Continued)

(58) Field of Classification Search
CPC .......... H01Q 1/088; H01Q 1/22; H01Q 13/06; H01Q 13/02; H01P 1/042; H01P 1/065; H01P 1/068; F16B 21/02; F16B 7/20
See application file for complete search history.

(56) References Cited

U.S. PATENT DOCUMENTS

| 2,892,987 A | 6/1959 | Cedrone |
| 3,019,041 A | 1/1962 | Scheublein, Jr. et al. |

(Continued)

FOREIGN PATENT DOCUMENTS

| CN | 101556366 | 10/2009 |
| CN | 102694264 | 9/2012 |

(Continued)

OTHER PUBLICATIONS

Extended European Search Report dated Feb. 29, 2016 from corresponding European Patent Application No. 15189780.8, 9 pages.

(Continued)

*Primary Examiner* — Ricardo I Magallanes
(74) *Attorney, Agent, or Firm* — Ohlandt, Greeley, Ruggiero and Perle, LLP

(57) ABSTRACT

A coupling assembly for a first device having a bayonet is provided. The coupling assembly includes a top plate, a bottom plate, and first fasteners securing the top and bottom plates to one another. The top plate having a slot along a connection axis, where the slot receives the bayonet. The bottom plate has a locking arm in axial alignment with the slot and a biasing arm in a region that is radially offset from the locking arm. The region of the bottom plate receives the bayonet, when in a locked position, with the locking arm preventing the bayonet, by interference with locking arm, from rotating about the connection axis back into alignment with the slot and with the biasing arm preventing the bayonet, by interference with biasing arm, from being withdrawn axially along the connection axis.

20 Claims, 10 Drawing Sheets

(51) Int. Cl.
*H01P 1/04* (2006.01)
*H01Q 1/08* (2006.01)
*H01Q 1/22* (2006.01)
*H01Q 13/06* (2006.01)
*H01Q 13/02* (2006.01)

(52) U.S. Cl.
CPC ........... *H01Q 1/1228* (2013.01); *H01Q 13/06* (2013.01); *H01Q 13/02* (2013.01)

(56) References Cited

U.S. PATENT DOCUMENTS

| | | |
|---|---|---|
| 3,039,797 A | 6/1962 | Harper |
| 3,241,144 A | 3/1966 | Berger |
| 3,512,162 A | 5/1970 | Siebold et al. |
| 3,898,666 A | 8/1975 | Massa |
| 3,987,452 A | 10/1976 | Godet |
| 4,157,876 A | 6/1979 | DiGiulio |
| 4,515,336 A | 5/1985 | Fischer |
| 4,623,858 A * | 11/1986 | Montesanto ............ H01P 1/042 333/255 |
| 4,755,830 A | 7/1988 | Plunk |
| 5,402,139 A | 3/1995 | Maeshima |
| 5,790,910 A | 8/1998 | Haskin |
| 5,835,068 A | 11/1998 | Paul et al. |
| 5,867,132 A | 2/1999 | Blasing et al. |
| 5,870,062 A | 2/1999 | Cox |
| 6,045,103 A | 4/2000 | Costa et al. |
| 6,140,893 A | 10/2000 | Sciarrino |
| 6,292,142 B1 * | 9/2001 | Pittman ..................... F16B 7/20 343/700 MS |
| 6,302,447 B1 | 10/2001 | Lee |
| 6,535,177 B1 | 3/2003 | Dhellemmes et al. |
| 6,664,937 B2 | 12/2003 | Vermette et al. |
| 6,911,950 B2 | 6/2005 | Harron |
| 7,142,168 B1 | 11/2006 | Sinclair |
| 7,265,732 B2 | 9/2007 | Lin |
| 7,439,930 B2 | 10/2008 | Bury |
| 7,748,670 B1 | 7/2010 | Veldez |
| 7,954,777 B2 | 6/2011 | Bohm et al. |
| 9,225,071 B2 | 12/2015 | Lee et al. |
| 2002/0084396 A1 | 7/2002 | Weaver |
| 2002/0105475 A1 | 8/2002 | Overton et al. |
| 2002/0125971 A1 | 9/2002 | Sciarrino |
| 2003/0090820 A1 | 5/2003 | Matsuura et al. |
| 2005/0024276 A1 | 2/2005 | Izumi |
| 2005/0127261 A1 | 6/2005 | Lin |
| 2008/0121767 A1 | 5/2008 | Wimberley |
| 2008/0165076 A1 | 7/2008 | Pan |
| 2010/0066633 A1 | 3/2010 | Singer |
| 2010/0315306 A1 | 12/2010 | Strydesky |
| 2013/0162492 A1 | 6/2013 | Kishino et al. |
| 2016/0040705 A1 | 2/2016 | Peter et al. |
| 2016/0104929 A1 * | 4/2016 | Taptic ................... H01Q 13/02 343/781 R |

FOREIGN PATENT DOCUMENTS

| | | | |
|---|---|---|---|
| CN | 102820833 | 12/2012 | |
| CN | 103098305 | 5/2013 | |
| CN | 203039049 | 7/2013 | |
| CN | 203166097 | 8/2013 | |
| CN | 203553357 | 4/2014 | |
| CN | 103852834 | 6/2014 | |
| CN | 103907246 | 7/2014 | |
| CN | 204230388 | 3/2015 | |
| EP | 3010085 | 4/2016 | |
| FR | 2636779 A * | 3/1990 | ............. H01P 1/042 |
| JP | 4-123610 | 11/1992 | |
| WO | 02063711 | 8/2002 | |
| WO | 2013/071205 | 5/2013 | |
| WO | WO-2015076885 A1 * | 5/2015 | ............. H01P 1/042 |

OTHER PUBLICATIONS

Extended European Search Report dated Oct. 12, 2018 in corresponding European Patent Application No. 18170498.2, 8 pages.
First Chinese Office Action dated Mar. 4, 2019 in related Chinese Patent Application No. 201510661757.X, 27 pages.
Second Office Action dated Dec. 3, 2019 in corresponding Chinese Patent Application No. 201510661757.X, 21 pages.
European Office Action dated Mar. 24, 2020 from corresponding European Patent Application No. 18 170 498.2, 6 pages.

* cited by examiner

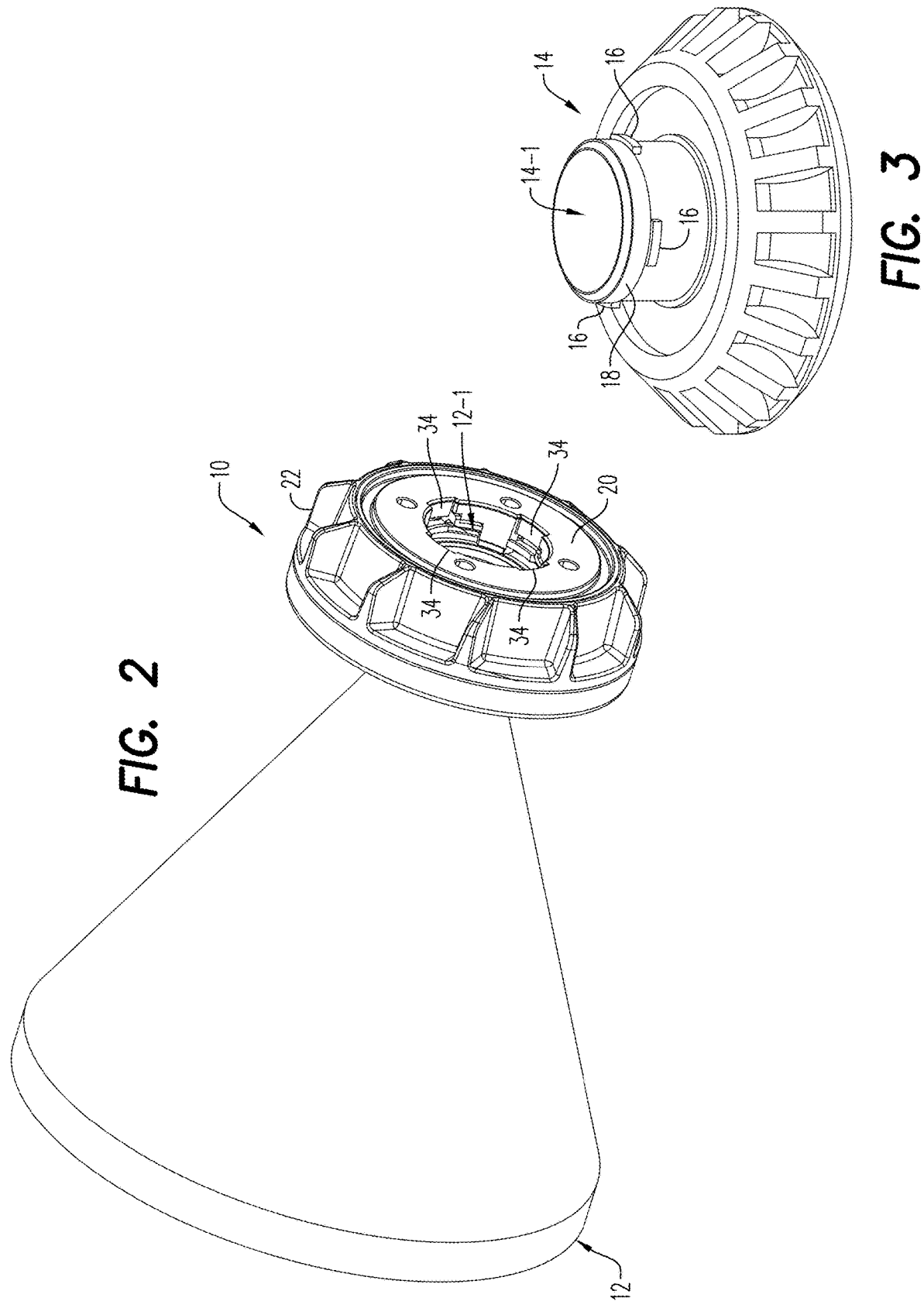

QUICK COUPLING ASSEMBLIES

CROSS REFERENCE TO RELATED APPLICATION

This application is a continuation of U.S. application Ser. No. 15/587,079 filed May 4, 2017, which issued as U.S. Pat. No. 10,587,031 on Mar. 10, 2020, the entire contents of which are incorporated herein by reference.

BACKGROUND

1. Field of the Disclosure

The present disclosure generally relates to coupling assemblies. More particularly, the present disclosure relates to coupling assemblies that are configured to form a quick mechanical connection between two devices in a manner that also forms a seal therebetween. In some embodiments, the coupling assemblies of the present disclosure are particularly suited for use in connecting devices in the form of a radio and an antenna to one another.

2. Description of Related Art

Coupling assemblies are known. Such assemblies have found use mechanically connecting two devices to one another where the devices can include, but are not limited to, mechanical devices, electrical devices, optical devices, hydraulic devices, fluidic devices, other devices, and combinations thereof.

In some instances, it is desired for the coupling assembly to form the mechanical connection in rapid or easy to form manner. These so called "quick" coupling assemblies have taken a variety of configurations, but are generally configured to allow the connection of two devices without the use of tools, with a minimum number of manual manipulations, and often with the use of only a single hand. In other instances, it is desired for the coupling assembly to form a seal between the devices in addition to the mechanical connection.

For example, the connection of an antenna and a radio (e.g., transmitter and/or receiver) to one another often requires an easy to assemble mechanical connection between the antenna and the radio that, in some instances, forms a seal.

It has been determined by the present disclosure that there is a continuing need for quick coupling assemblies that overcome, alleviate, and/or mitigate one or more of the issues of prior art assemblies.

SUMMARY

A coupling assembly for a first device having a bayonet is provided. The coupling assembly includes a top plate, a bottom plate, and first fasteners securing the top and bottom plates to one another. The top plate having a slot along a connection axis, where the slot receives the bayonet. The bottom plate has a locking arm in axial alignment with the slot and a biasing arm in a region that is radially offset from the locking arm. The region of the bottom plate receives the bayonet, when in a locked position, with the locking arm preventing the bayonet, by interference with locking arm, from rotating about the connection axis back into alignment with the slot and with the biasing arm preventing the bayonet, by interference with biasing arm, from being withdrawn axially along the connection axis.

In some embodiments either alone or in combination with any of the aforementioned or after mentioned embodiments, the coupling assembly includes a second fastener to secure the coupling assembly to a second device with the bottom plate proximate the second device.

In some embodiments either alone or in combination with any of the aforementioned or after mentioned embodiments, the biasing arm, when in the locked position, adds a biasing force along the connection axis to the bayonet.

In some embodiments either alone or in combination with any of the aforementioned or after mentioned embodiments, the bottom plate is configured so that the bayonet moves between an upper surface of the locking arm when the bayonet is in the slot and a lower surface of the biasing arm when the bayonet is in the region.

In some embodiments either alone or in combination with any of the aforementioned or after mentioned embodiments, the locking arm and/or the biasing arm are resiliently flex or bend to allow bayonet to move between the slot and the region.

In some embodiments either alone or in combination with any of the aforementioned or after mentioned embodiments, the coupling assembly further includes an outer rim and first fasteners securing the top and bottom plates to one another so that the outer rim is rotatable about the connection axis between a first position and a second position.

In some embodiments either alone or in combination with any of the aforementioned or after mentioned embodiments, the coupling assembly further includes a rotational biasing member securing the outer ring to the top plate and/or bottom plate, the rotational biasing member biasing the outer ring to the first position.

In some embodiments either alone or in combination with any of the aforementioned or after mentioned embodiments, the rotational biasing member is an elastic member.

In some embodiments either alone or in combination with any of the aforementioned or after mentioned embodiments, the outer ring includes a cam that moves the locking arm from the locked upon rotation of the outer ring about the connection axis to the second position.

In some embodiments either alone or in combination with any of the aforementioned or after mentioned embodiments, the coupled assembly further includes a securing element that interferes with or abuts a feature of the bottom plate to prevent rotation of the outer ring from the first position.

A coupled assembly is also provided that includes a radio having a bayonet on a radio waveguide and a coupling assembly having a top plate and a bottom plate. The top plate has a slot along a connection axis, where the slot receives the bayonet. The bottom plate has a locking arm in axial alignment with the slot and a biasing arm in a region that is radially offset from the locking arm. The region, when in a locked position, receives the bayonet with the locking arm preventing the bayonet, by interference with locking arm, from rotating about the connection axis back into alignment with the slot and with the biasing arm preventing the bayonet, by interference with biasing arm, from being withdrawn axially along the connection axis.

In some embodiments either alone or in combination with any of the aforementioned or after mentioned embodiments, the coupled assembly further includes an antenna secured to the coupling assembly. The antenna has an antenna waveguide in electromagnetic connection with the radio waveguide when in the locked position.

In some embodiments either alone or in combination with any of the aforementioned or after mentioned embodiments, the coupled assembly further includes a seal positioned between the antenna and the radio.

In some embodiments either alone or in combination with any of the aforementioned or after mentioned embodiments, the biasing arm applies a biasing force to the bayonet, when in the region, along the connection axis.

In some embodiments either alone or in combination with any of the aforementioned or after mentioned embodiments, the coupled assembly further includes an outer rim and first fasteners securing the top and bottom plates to one another so that the outer rim is rotatable about the connection axis between a first position and a second position.

In some embodiments either alone or in combination with any of the aforementioned or after mentioned embodiments, the coupled assembly further includes a rotational biasing member securing the outer ring to the top plate and/or bottom plate. The rotational biasing member biasing the outer ring to the first position.

In some embodiments either alone or in combination with any of the aforementioned or after mentioned embodiments, the outer ring includes a cam that moves the locking arm from the locked upon rotation of the outer ring about the connection axis to the second position.

In some embodiments either alone or in combination with any of the aforementioned or after mentioned embodiments, the coupled assembly further includes a securing element that interferes with or abuts a feature of the bottom plate to prevent rotation of the outer ring from the first position.

A method of coupling and uncoupling a first device and a second device is provided. The method includes: inserting, along a connection axis, a bayonet of the first device into a slot of a coupling assembly, the coupling assembly being secured to the second device, the coupling having a locking arm that is axially aligned with the slot and a biasing arm in a region that is radially offset from the locking arm; and rotating, about the connection axis, the first and second devices with respect to one another to move the bayonet from the slot to the region, the locking arm having a normal position that interferes with movement of the bayonet from the region to the slot, the biasing arm applying a biasing force along the connection axis on the bayonet.

In some embodiments either alone or in combination with any of the aforementioned or after mentioned embodiments, the rotating of the first and second devices with respect to one another includes rotating between 5 and 45 degrees.

In some embodiments either alone or in combination with any of the aforementioned or after mentioned embodiments, the method further includes: rotating, about the connection axis, an outer ring of the coupling to move the locking arm from the normal position; rotating, about the connection axis, the first and second devices with respect to one another to move the bayonet from the region to the slot; and withdrawing, along the connection axis, the bayonet from the slot.

In some embodiments either alone or in combination with any of the aforementioned or after mentioned embodiments, the rotating of the outer ring includes rotating between 5 and 45 degrees.

The above-described and other features and advantages of the present disclosure will be appreciated and understood by those skilled in the art from the following detailed description, drawings, and appended claims.

BRIEF DESCRIPTION OF THE DRAWINGS

FIG. 2 is a rear view of the coupling assembly of FIG. 1;

FIG. 3 is a front view of the antenna for use with the coupling assembly of FIG. 1

DETAILED DESCRIPTION

Figure 1:
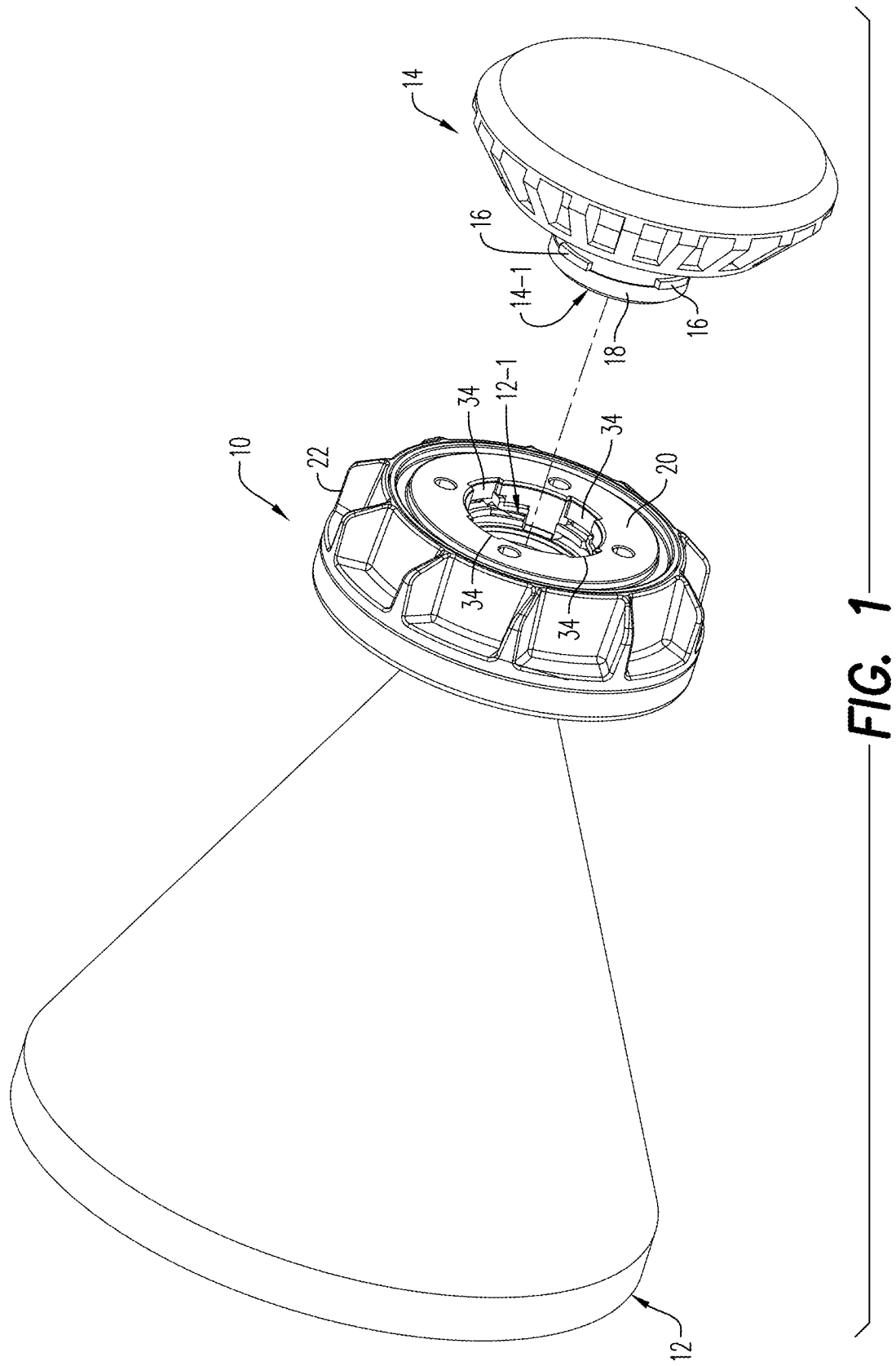
FIG. 1 perspective view of coupling assembly according to an exemplary embodiment of the present disclosure shown in use between a radio and an antenna.

Referring now to the drawings and in particular to FIGS. 1 to 3, an exemplary embodiment of a quick coupling assembly according to the present disclosure is shown and is generally referred to by reference numeral 10. Coupling 10 is shown by way of exampling connecting an antenna 12 and a radio 14 to one another, where the antenna has one or more bayonets 16 (four shown) depending therefrom.

As will be described in more detail herein below, coupling 10 has a corresponding number of slots that are configured to form a lockable mechanical connection with bayonet(s) 16 of radio 14 in a manner that biases the bayonets in the slots along the connection axis A so as to add a biasing or compressive force to the connection of the antenna and radio. In the illustrated embodiment, bayonets 16 are positioned on a waveguide 14-1 of radio 14. Waveguide 14-1 is configured to guide an RF signal between antenna 12 and radio 14. Thus, waveguide 14-1 forms an electromagnetic connection between radio 14 and a corresponding waveguide 12-1 of antenna 12 so that the RF signal (e.g., microwave power) flows on the inside volume and passes across the connection, preferably without reflection or loss, with a seal 18 (FIG. 2) sealing an outside surface of the waveguide 12-1 and/or 14-2. In some embodiments, at least a portion of the biasing or compressive force from coupling 10 is applied to seal 18.

In other embodiments, seal 18 can have a cross-sectional shape configured to mate with the outside surface of waveguide 12-1, which has a corresponding cross-sectional shape. For example, seal 18 and the outside surface of waveguide 12-1 are illustrated in an exemplary embodiment as having a frusto-conical shape. Of course, it is contemplated by the present disclosure for seal 18 and waveguide 12-1 to have any desired shape sufficient to form the desired electromagnetic connection between antenna 12 and radio 14 and form the desired seal therebetween.

Accordingly, seal 18 protects the inside of antenna 12 and/or radio 14 from the environmental elements (e.g., rain, snow, humidity, dust, etc.), but also prevents leakage of any potential matter (e.g., hydraulic fluid from the inside device while allowing for the electromagnetic connection between the antenna and the radio.

In some embodiments, coupling 10 is sufficient—with or without the biasing—so that seal 18 between antenna 12 and radio 14 forms a hermetic seal. As used herein, the terms "hermetic seal" and "hermetically seal" shall mean a seal that is configured to prevent the passage of contaminants into and/or out of the coupling assembly. The contaminants can be in the form of liquids (e.g., rain), gases (e.g., humidity), particulates (e.g., snow, dust), hydraulic fluid, and other environmental contaminants.

It should be recognized that coupling 10 is disclosed by way of example only in use with antenna 12 and radio 14. Of course, it is contemplated by the present disclosure for coupling 10 to find use with any desired device.

Advantageously, coupling 10 is configured to form, between devices 12, 14, a mechanical connection and a seal with a simple insertion action of one device (i.e., radio 14) into the other (i.e., antenna 12), followed by a single first rotating action of the devices with respect to one another of 25 degrees.

In some embodiments alone or in combination with one or more of the aforementioned and/or aft mentioned embodiments, coupling 10 is advantageously configured to uncouple a previously formed mechanical connection and seal with a set of rotating actions and a withdrawal action where one device 14 is withdrawn from the other device 12. The set of rotating actions include a second rotating action of 20 degrees of one portion of coupling 10, followed by a third rotating action of the devices 12, 14 with respect to one another the same amount but in an opposite direction as the first rotating action, namely of 25 degrees.

The various rotating actions used during the assembly and disassembly of coupling 10 are each disclosed above as being 20 and 25 degrees, respectively—which is an example of an amount of rotation contemplated by the present disclosure as forming a "quick coupling". Of course, it is contemplated by the present disclosure for coupling 10 to be configured for any desired amount of rotating that allows for quick coupling such as, but not limited to, between 5 and 45 degrees, preferably between 10 and 30 degrees, with between 15 and 25 degrees being most preferred, and any combination of subranges therebetween.

Figure 4:
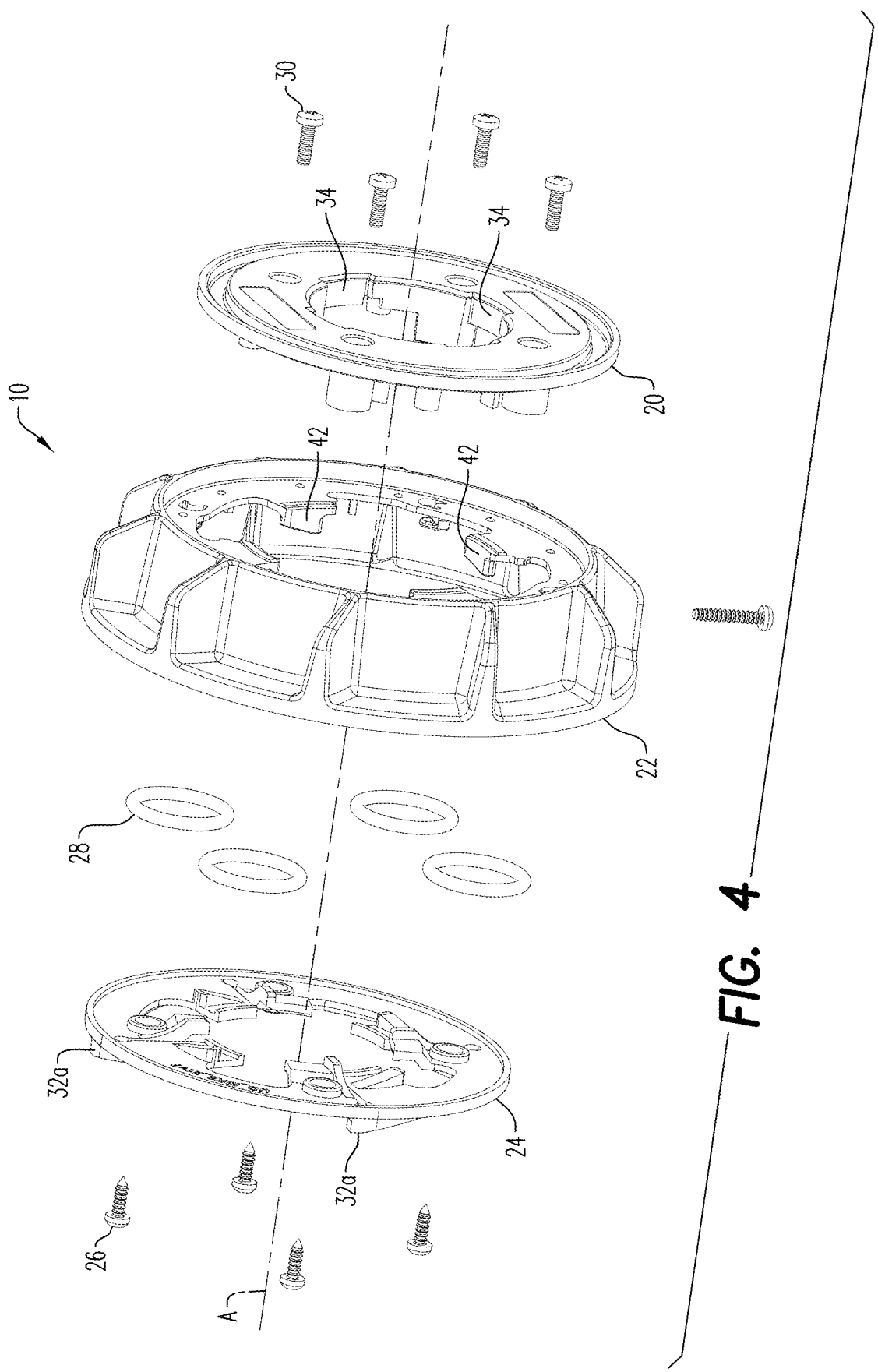
FIG. 4 is an exploded perspective the coupling assembly of FIG. 1.
Figure 5:
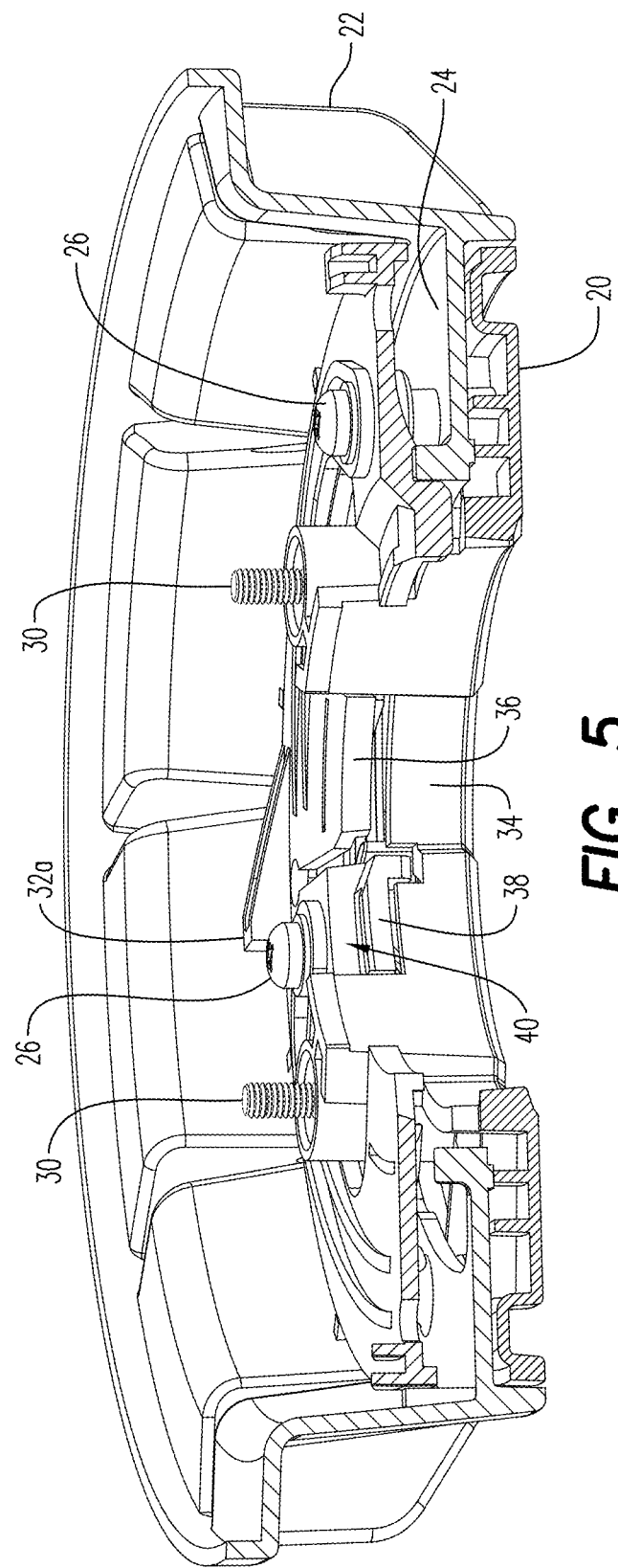
FIG. 5 is a sectional view of the coupling assembly of FIG. 1.

Coupling 10 is described in more detail with simultaneous reference to FIGS. 4 and 5. Coupling 10 has a top plate 20, an outer ring 22, and a bottom plate 24.

Figure 11:
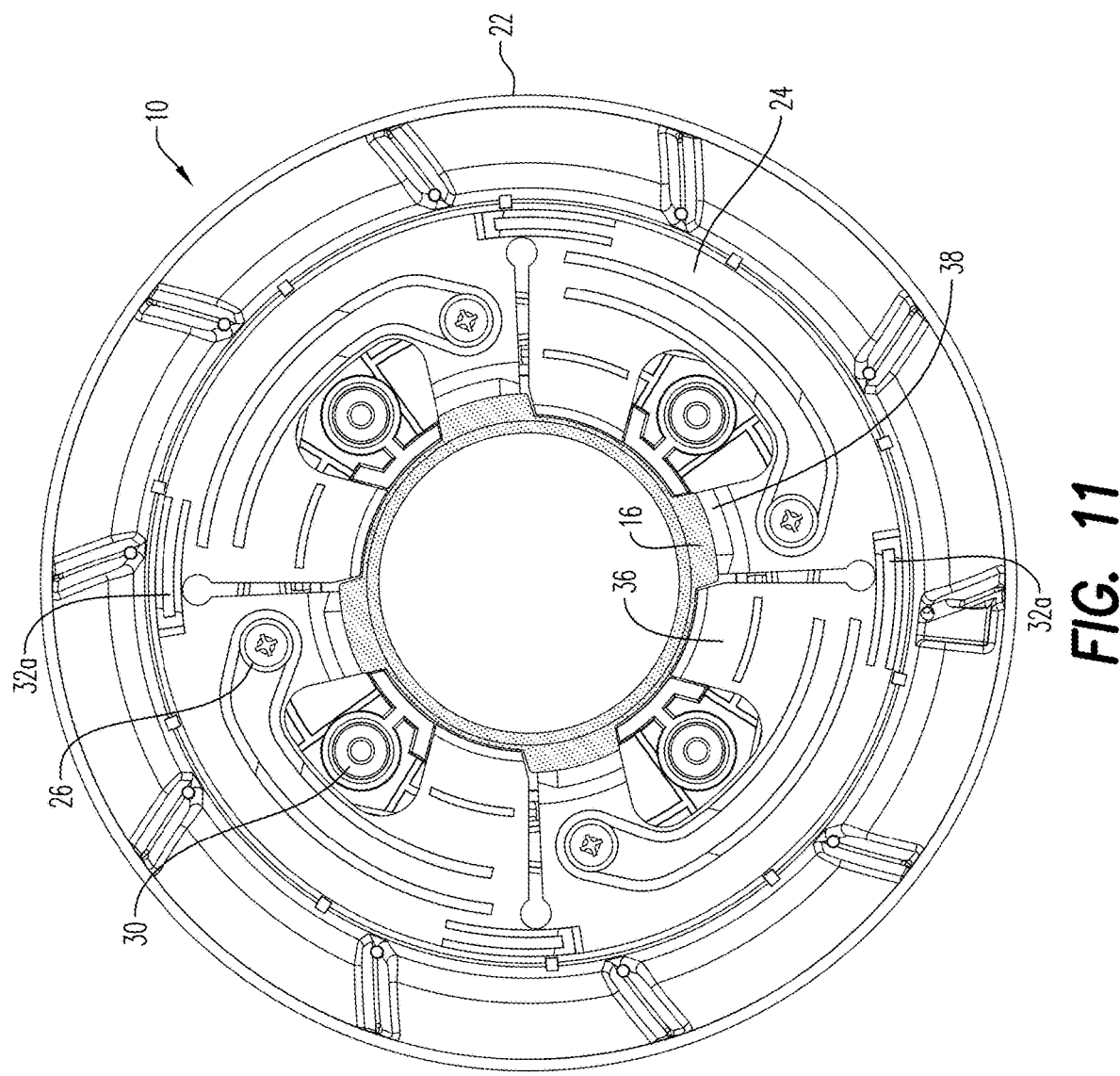
FIG. 11 is an end view of the coupling assembly of FIG. 1 at a first or unlocked stage of a disassembly process of disassembling the radio and antenna from one another.

Top and bottom plates 20, 24 are connected to one another by one or more first fasteners 26 with outer ring 22 disposed therebetween so that the outer ring can rotate about connection axis A between a first or normal position (FIG. 9) and a second position (FIG. 11).

First fasteners 26 are illustrated in FIG. 4 by way of example as mechanical fasteners—namely as screws. However, first fastener(s) 26 are contemplated by the present disclosure to be formed by any desired fastening mechanism such as, but not limited to, a mechanical fasteners, adhesive fasteners, thermal fasteners, and combinations thereof.

In some embodiments, coupling 10 further includes one or more rotational biasing members 28 securing outer ring 22 to top plate 20, bottom plate 24, or both the top and bottom plates. Rotational biasing members 28 are configured to bias outer ring 22 to a predetermined rotational position/direction about axis A—for example to bias the outer ring to the first or normal position (FIG. 9).

In the illustrated embodiment, members 28 are illustrated as circular elastic members. Of course, it is contemplated by the present disclosure for members 28 to be any desired biasing member such as, but not limited to, compression springs, extension springs, torsion springs, elongated elastic members, and others.

Coupling 10 is securable to antenna 12 by one or more second fasteners 30. Second fasteners 30 are illustrated in FIG. 4 by way of example as mechanical fasteners—namely as screws. However, second fastener(s) 30 are contemplated by the present disclosure to be formed by any desired fastening mechanism such as, but not limited to, a mechanical fasteners, adhesive fasteners, thermal fasteners, and combinations thereof.

Figure 9:
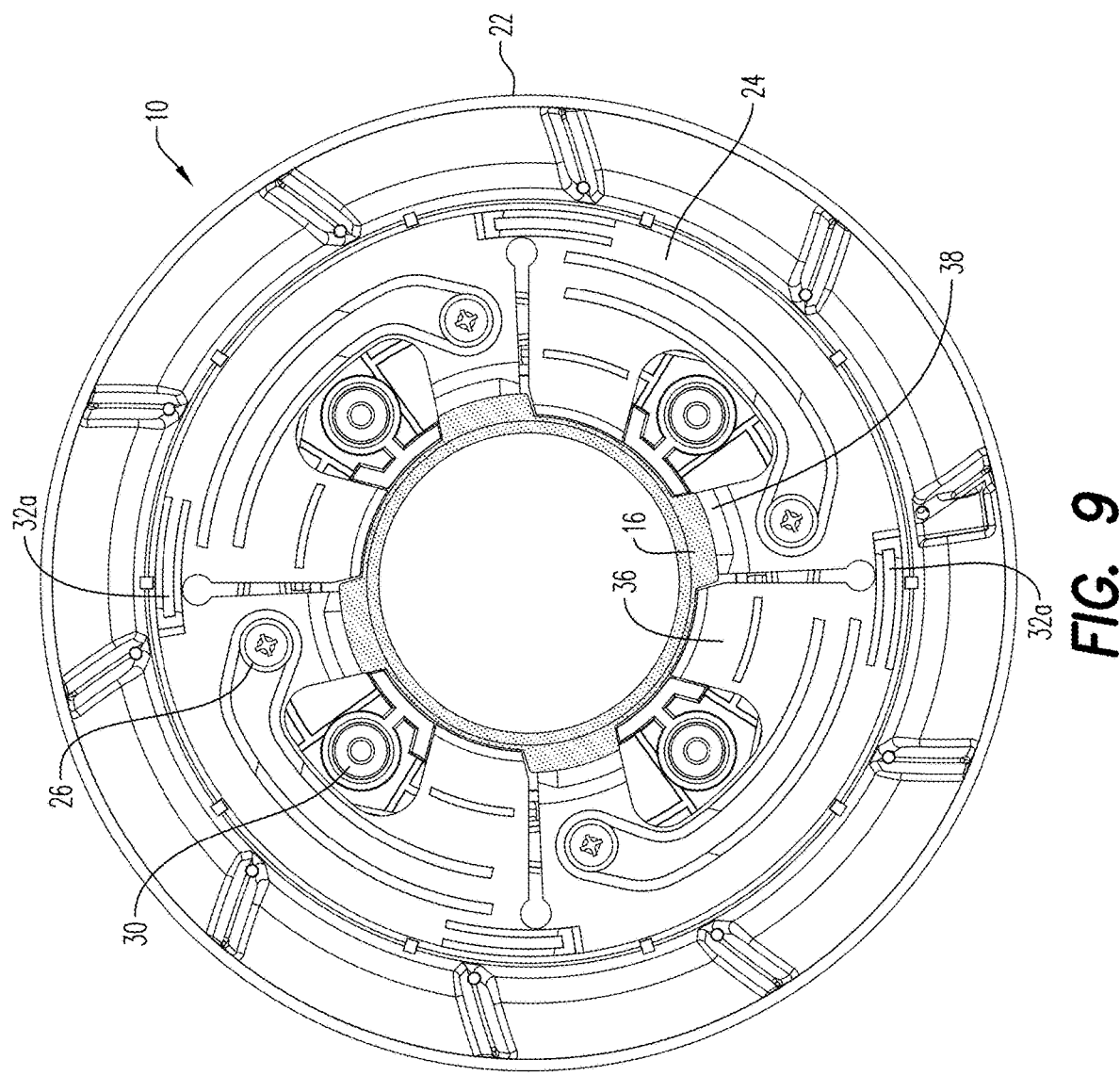
FIG. 9 is an end view of the coupling assembly of FIG. 1 at a fully assembled or locked stage of the assembly process.

In some embodiments, coupling 10 can include a securing element 32 that can be used, after coupling 10 has connected devices 12, 14 to one another, to prevent inadvertent movement of outer ring 24 from the first or normal position (FIG. 9). In the illustrated embodiment, securing element 32—when secured to coupling 10—can interfere with or abut a feature 32a of bottom plate 24 to prevent rotation about axis A.

Coupling 10 defines one or more slots 34 that correspond in number to the one or more bayonets 16—with the bayonets being inserted into the slots by axial movement along connection axis A. Specifically and in the embodiment illustrated where antenna 12 is connected to coupling 10 by second fasteners 30 with bottom plate 24 proximate the antenna and top plate 20 facing outward, radio 14 is inserted into coupling 10 so that bayonet(s) 16 are received in slots 34.

For clarity of description, coupling 10 will be described with reference to a single slot 34 and bayonet 16 although four slots and bayonets are shown. Of course, it is contemplated by the present disclosure for coupling 10 to find use with one or more slots 34 and a corresponding or non-corresponding number of bayonets 16.

Bottom plate 24 advantageously includes—for each slot 34—a locking arm 36 in axial alignment with slot 34 and a biasing arm 38 in a region 40 that is radially offset from the locking arm. Region 40 is configured to receive—upon rotation of devices 12, 14 with respect to one another about connection axis A—bayonet 16.

In this manner, coupling 10 defines an unlocked position (FIG. 6) where bayonet 16 is in slots 34 and a locked position (FIG. 9) where bayonet 16 is in region 40. In the locked position, coupling 10 prevents bayonet 16, by interference with locking arm 36, from rotating about axis A back into alignment with slot 34 and prevents the bayonet, by interference with biasing arm 36, from withdrawing axially along axis A.

Additionally in the locked position, coupling 10 biases bayonet 16, by biasing arm 38 acting on the bayonet, along connection axis A so as to add a biasing or compressive force on abutting surfaces the antenna 12 and the radio 14. In the exemplary embodiment of biasing arm 38 illustrated, the biasing arm 38 resiliently flexes or bends under the resilience of the material of bottom plate 24. However, it is also contemplated by the present disclosure for coupling 10 to include a further biasing member (not shown) to assist in the movement of biasing arm 38.

Stated another way, coupling 10 allows radio 14—after insertion into slot along axis A—to be rotated about axis A once in a bottom most portion of slot 34 so that bayonet 16 moves to region 40 that is radially offset from the slot. When bayonet 16 is in slot 34, radio 14 can be inserted into/withdrawn from the slot along axis A. However when is bayonet 16 is in region 40, radio 14 is prevent from being rotated about axis A or withdrawn from coupling 10.

Coupling 10 is configured so that bayonet 16 moves (e.g., rotating of antenna 12 and radio 14 with respect to one another about axis A) between an upper surface of locking arm 36 when in slot 34 and a lower surface of biasing arm 38 when in region 40. During this movement, locking arm 36 and/or biasing arm 38 can resiliently flex or bend to allow bayonet 16 to move between slot 34 and region 40.

However when bayonet 16 is in region 40, locking arm 36 returns to its normal or locked position so that bayonet 16 interferes with the locking arm so that coupling 10 locks radio 14 and antenna 12 in the axial and rotational position defined by region 40. In the exemplary embodiment of locking arm 36 illustrated, the locking arm resiliently flexes or bends under the resilience of the material of bottom plate 24. However, it is also contemplated by the present disclosure for coupling 10 to include a further biasing member (not shown) to assist in the movement of locking arm 36.

As discussed above, outer ring 22 is rotatable about axis A—which is configured to move locking arm 36 from its normal position—to allow unlocking of coupling 10. In the illustrated embodiment, outer ring 22 includes a cam 42 that, upon rotation about axis A, acts on locking arm 36 to move the locking arm from the normal or locked position out of interference with the bayonet 16—to allow movement of bayonet 16 from region 40 into slot 34.

The operation of coupling 10 is described in more detail with reference to FIGS. 6-11, which are end views of the coupling taken from the side of antenna 12.

Figure 6:
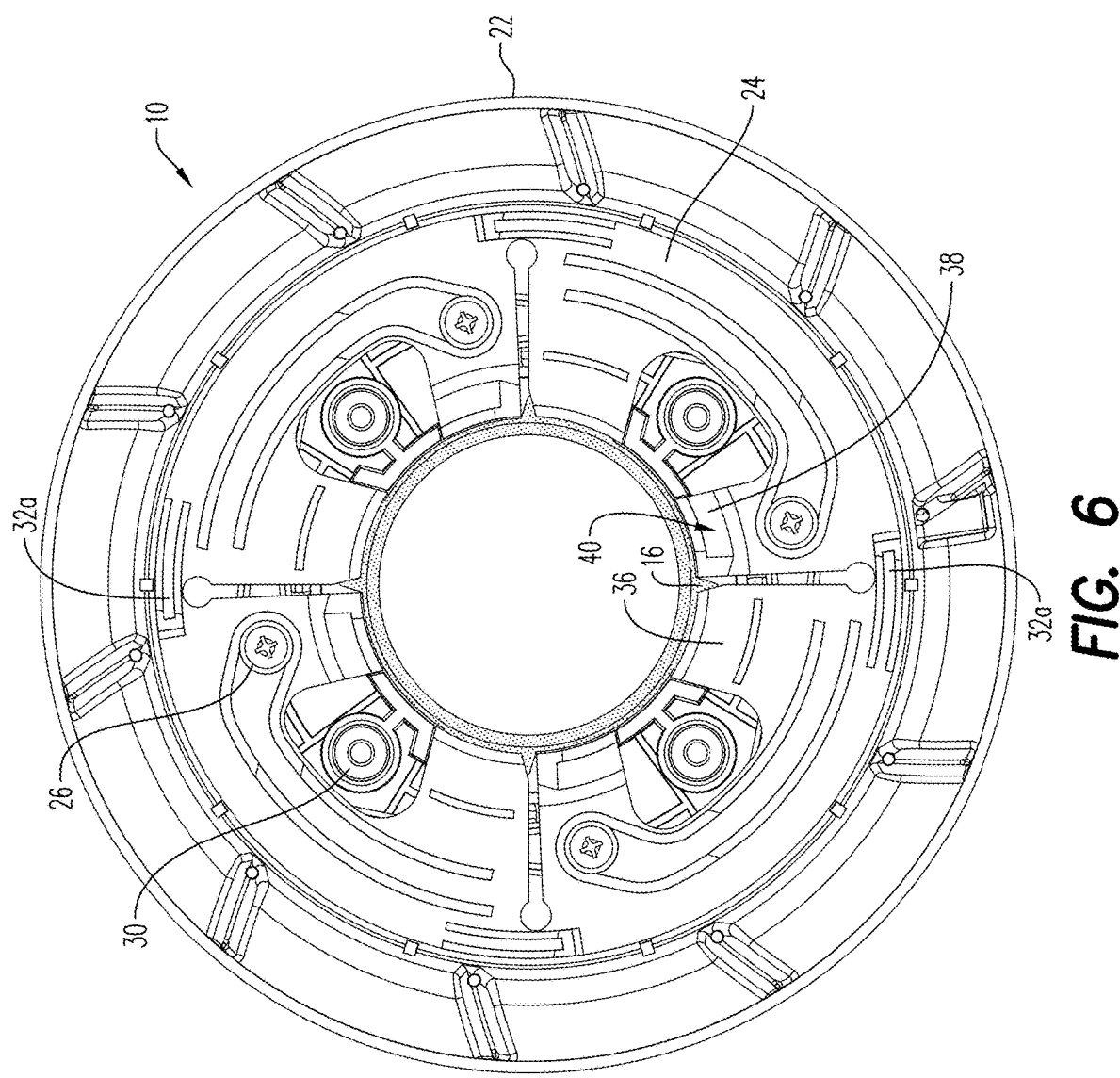
FIG. 6 is an end view of the coupling assembly of FIG. 1 at a first stage of a process of assembling the radio and antenna to one another.

FIG. 6 illustrates coupling 10 at a first stage of a process of assembling radio 14 and antenna 12 to one another, namely as bayonet 16 of the radio are inserted into slot 34 axially along axis A. In this stage, outer ring 22, locking arm 36, and biasing arm 38 are all in their normal or locked position.

Figure 7:
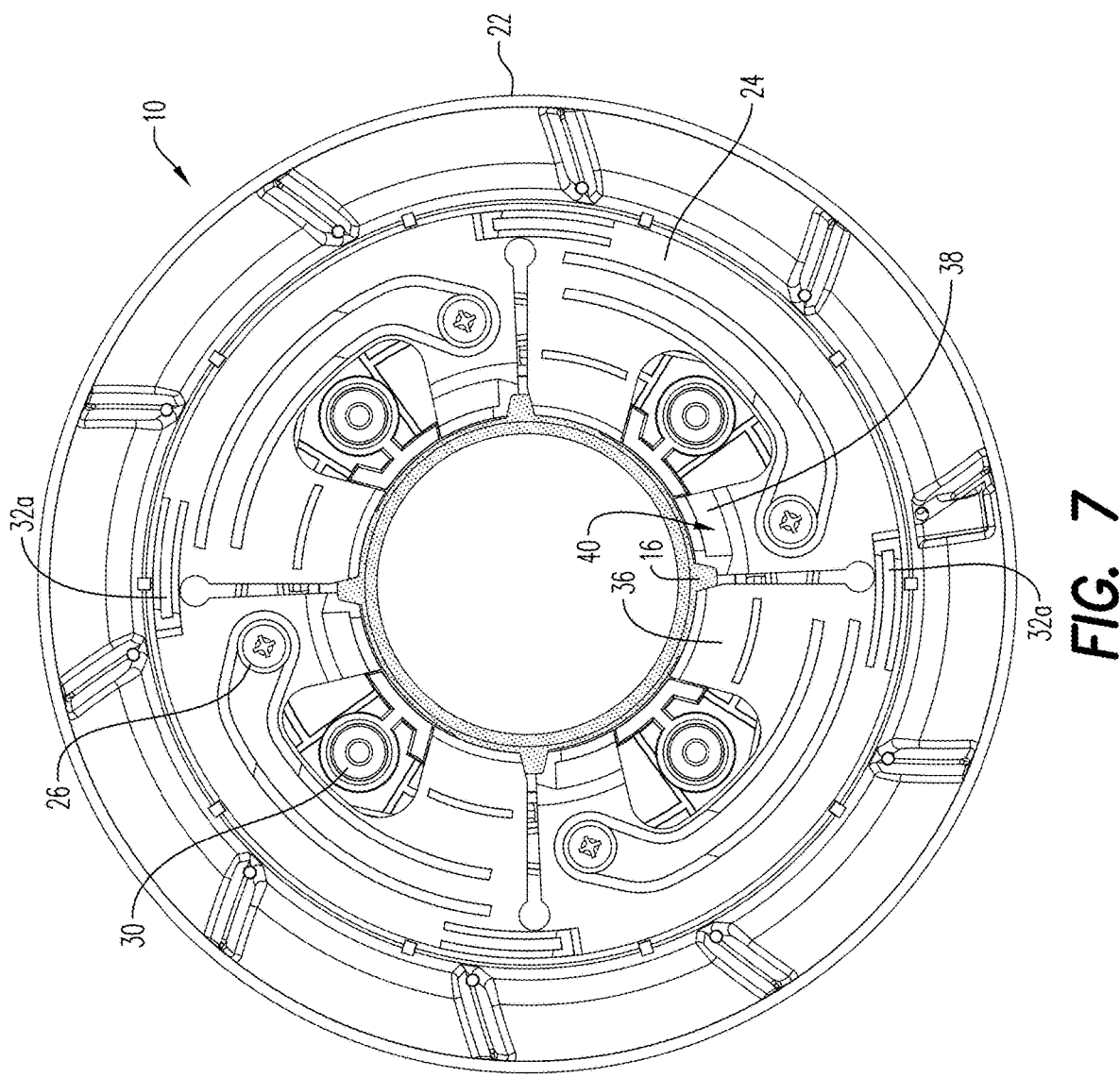
FIG. 7 is an end view of the coupling assembly of FIG. 1 at a later stage of the assembly process.

FIG. 7 illustrates coupling 10 during a later stage of the assembly process, where radio 14 has been inserted into the coupling with bayonet 16 in slot 34, but before rotation about axis A of the radio and antenna 12 with respect to one another. In this stage, outer ring 22, locking arm 36, and biasing arm 38 are all in their normal or locked position.

Figure 8:
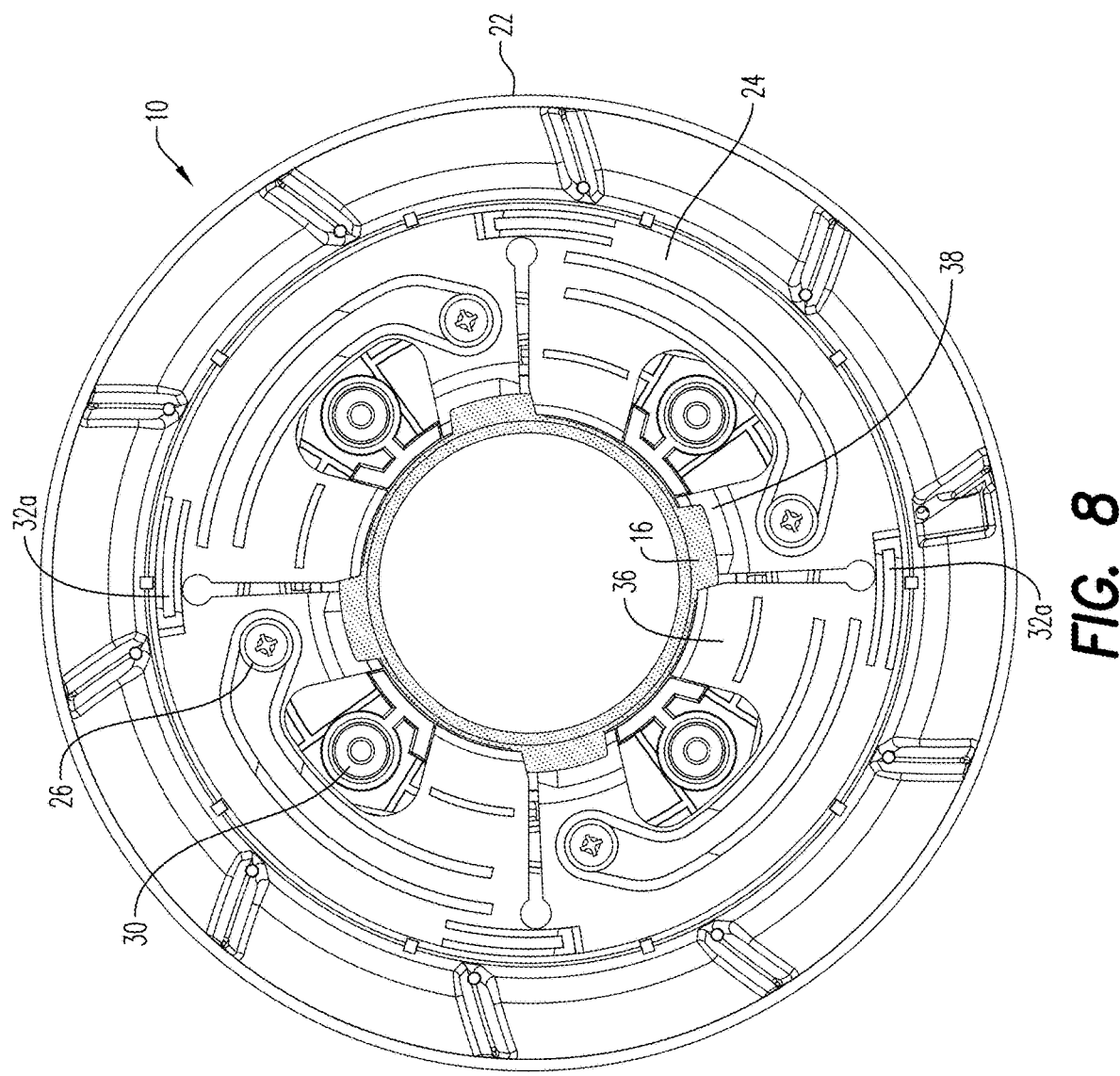
FIG. 8 is an end view of the coupling assembly of FIG. 1 at a still later stage of the assembly process.

FIG. 8 illustrates coupling 10 during a next stage of the assembly process, where radio 14 has been inserted into the coupling so that bayonet 16 slides in slot 34 along axis A until the bayonet is positioned on an upper surface of locking arm 36 and during rotation about axis A of the radio and antenna 12 with respect to one another. In this stage, outer ring 22 is in the normal or locked position, but locking arm 36 is flexing in one direction, while biasing arm 38 is flexing in an opposite direction to allow bayonet 16 to move—as the radio and antenna are rotated with respect to one another—from slot 34 to region 40.

FIG. 9 illustrates coupling 10 at a fully assembled or locked stage of the assembly process, where radio 14 has been inserted into the coupling until radio and antenna 12 have been rotated about axis A with respect to one another to the locked position. Here, bayonet 16 is in region 40 and locking arm 36 has flexed back to its normal position where the locking arm and the bayonet interfere with one another to prevent the bayonet from rotating about axis A back into slot 34 or from being withdrawn along axis A. In some embodiments, coupling 10 is configured so that biasing arm 38 remains in an at least partially flexed condition when bayonet 16 is in region—to add a biasing or compressive force on seal 18. Thus in this stage, outer ring 22 and locking arm 36 are in the normal or locked position, but biasing arm 38 at least partially flexed.

Figure 10:
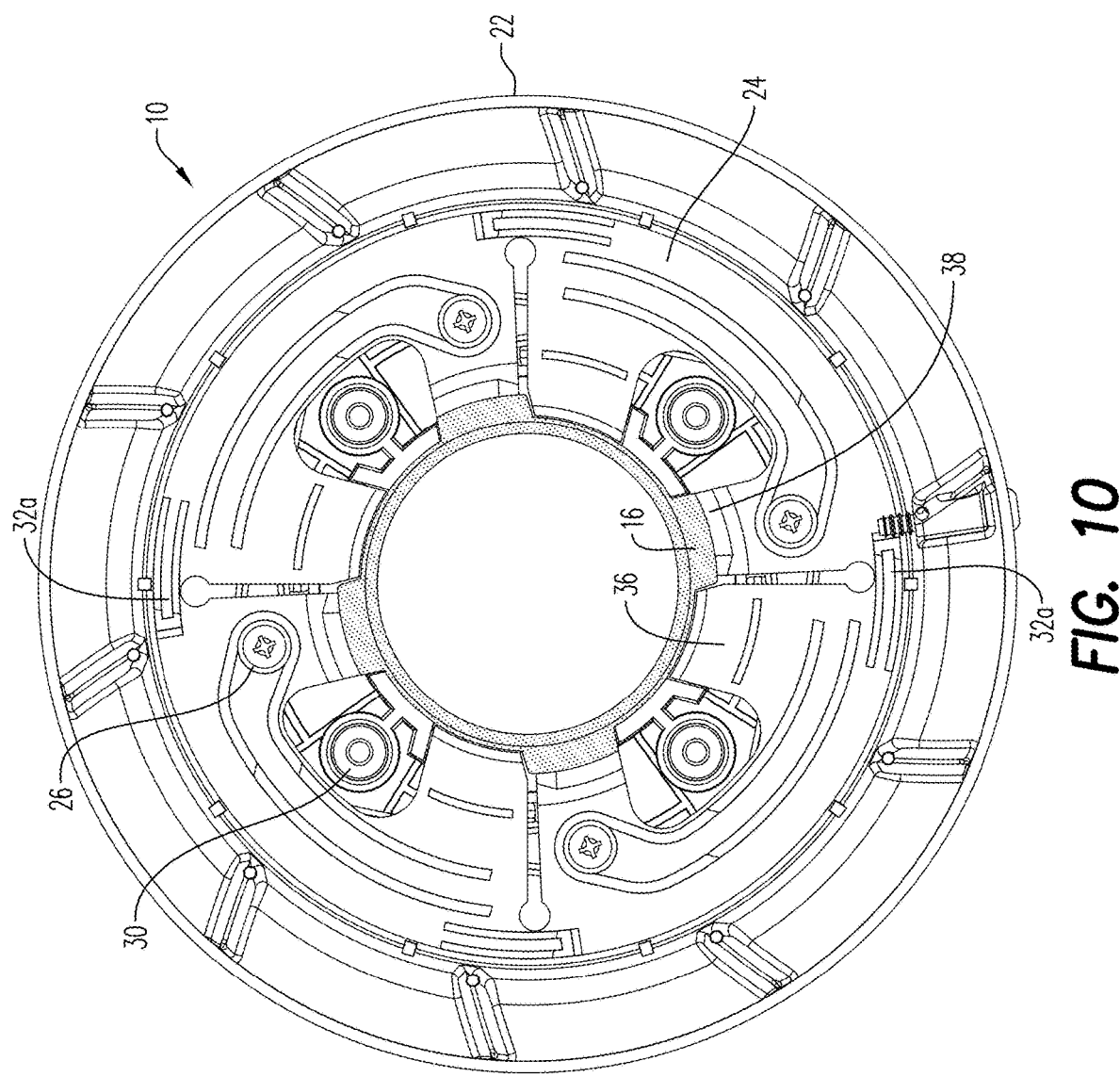
FIG. 10 is an end view of the coupling assembly of FIG. 1 at a secured stage of the assembly process.

FIG. 10 illustrates coupling 10 at a secured stage of the assembly process—where securing element 32 has been inserted into the coupling so that the securing element interfere with or abuts feature 32a of bottom plate 24 to prevent inadvertent rotation of outer ring 22 about axis A.

FIG. 11 illustrates coupling 10 at a first or unlocked stage of a disassembly process of disassembling the radio and antenna from one another. Here, securing member 32 has been removed and outer ring 22 has been rotated about axis A so that cam 42 acts on locking arm 36 to flex the locking arm out of interference with bayonet 16. While locking arm 36 is flexed, radio 14 and antenna 12 can be rotated with respect to one another about axis A so that bayonet 16 moves from region 40 into slot 34, where the radio can be withdrawn from coupling 10. Once bayonet 16 is in slot 34, outer ring 22 can be released so that it returns to the normal position by rotational biasing members 28.

The various components of coupling 10—namely top plate 20, outer ring 22, and bottom plate 24 can be formed of any material having sufficient strength to withstand the forces applied to the coupling by the devices 12, 14. For example, it is contemplated by the present disclosure for top plate 20, outer ring 22, and bottom plate 24 to be formed of machined or molded plastic, metal, or composite materials.

It should also be noted that the terms "first", "second", "third", "upper", "lower", and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

LIST OF REFERENCE NUMERALS quick coupling assembly 10
antenna 12
antenna waveguide 12-1
radio 14
radio waveguide 14-1
bayonet 16
connection axis A
seal 18
top plate 20
outer ring 22
bottom plate 24.
first fasteners 26
rotational biasing members 28
second fasteners 30
securing element 32
feature 32a
slot 34
locking arm 36
biasing arm 38
region 40
cam 42

What is claimed is:

1. A coupling assembly for a first device having a bayonet, comprising:
   a top plate having a slot along a connection axis, the slot being configured to receive the bayonet;

a bottom plate having a locking arm in axial alignment with the slot and a biasing arm in a region that is radially offset from the locking arm;

first fasteners securing the top and bottom plates to one another, wherein the region is configured to receive the bayonet, when in a locked position, with the locking arm preventing the bayonet, by interference with locking arm, from rotating about the connection axis back into alignment with the slot and with the biasing arm preventing the bayonet, by interference with biasing arm, from being withdrawn axially along the connection axis, and wherein the bottom plate is configured so that the biasing arm resiliently flexes under resilience of a material of the bottom plate to, when in the locked position, add a biasing force along the connection axis to the bayonet.

2. The coupling assembly of claim 1, further comprising a second fastener configured to secure the coupling assembly to a second device with the bottom plate proximate the second device.

3. The coupling assembly of claim 1, wherein the bottom plate is configured so that the bayonet moves between an upper surface of the locking arm when the bayonet is in the slot and a lower surface of the biasing arm when the bayonet is in the region.

4. The coupling assembly of claim 3, wherein the locking arm and/or the biasing arm are configured to resiliently flex or bend to allow bayonet to move between the slot and the region.

5. The coupling assembly of claim 1, further comprising an outer ring and first fasteners securing the top and bottom plates to one another so that the outer ring is rotatable about the connection axis between a first position and a second position.

6. The coupling assembly of claim 5, further comprising a rotational biasing member securing the outer ring to the top plate and/or bottom plate, the rotational biasing member biasing the outer ring to the first position.

7. The coupling assembly of claim 6, wherein the rotational biasing member comprises an elastic member.

8. The coupling assembly of claim 5, wherein the outer ring comprises a cam configured to move the locking arm from the locked upon rotation of the outer ring about the connection axis to the second position.

9. The coupling assembly of claim 5, further comprising a securing element that interferes with or abuts a feature of the bottom plate to prevent rotation of the outer ring from the first position.

10. A coupled assembly, comprising
a radio having a bayonet on a radio waveguide; and
a coupling assembly having a top plate and a bottom plate, the top plate having a slot along a connection axis, the slot being configured to receive the bayonet, the bottom plate having a locking arm in axial alignment with the slot and a biasing arm in a region that is radially offset from the locking arm, wherein, when in a locked position, the region receives the bayonet with the locking arm preventing the bayonet, by interference with locking arm, from rotating about the connection axis back into alignment with the slot and with the biasing arm preventing the bayonet, by interference with biasing arm, from being withdrawn axially along the connection axis, and wherein the bottom plate is configured so that the biasing arm resiliently flexes under resilience of a material of the bottom plate to, when in the locked position, add a biasing force along the connection axis to the bayonet.

11. The coupled assembly of claim 10, further comprising an antenna secured to the coupling assembly, the antenna having an antenna waveguide in electromagnetic connection with the radio waveguide when in the locked position.

12. The coupled assembly of claim 11, further comprising a seal positioned between the antenna and the radio.

13. The coupled assembly of claim 10, further comprising an outer ring and first fasteners securing the top and bottom plates to one another so that the outer ring is rotatable about the connection axis between a first position and a second position.

14. The coupled assembly of claim 13, further comprising a rotational biasing member securing the outer ring to the top plate and/or bottom plate, the rotational biasing member biasing the outer ring to the first position.

15. The coupled assembly of claim 13, wherein the outer ring comprises a cam configured to move the locking arm from the locked upon rotation of the outer ring about the connection axis to the second position.

16. The coupled assembly of claim 13, further comprising a securing element that interferes with or abuts a feature of the bottom plate to prevent rotation of the outer ring from the first position.

17. A method of coupling and uncoupling a first device and a second device, comprising:
inserting, along a connection axis, a bayonet of the first device into a slot of a coupling assembly, the coupling assembly being secured to the second device, the coupling having a locking arm that is axially aligned with the slot and a biasing arm in a region that is radially offset from the locking arm; and
rotating, about the connection axis, the first and second devices with respect to one another to move the bayonet from the slot to the region, the locking arm having a normal position that interferes with movement of the bayonet from the region to the slot, the biasing arm applying a biasing force along the connection axis on the bayonet by resiliently flexing.

18. The method of claim 17, wherein the rotating of the first and second devices with respect to one another comprises rotating between 5 and 45 degrees.

19. The method of claim 17, further comprising:
rotating, about the connection axis, an outer ring of the coupling to move the locking arm from the normal position;
rotating, about the connection axis, the first and second devices with respect to one another to move the bayonet from the region to the slot; and
withdrawing, along the connection axis, the bayonet from the slot.

20. The method of claim 19, wherein the rotating of the outer ring comprises rotating between 5 and 45 degrees.

* * * * *